(12) United States Patent
Cousin et al.

(10) Patent No.: US 9,270,271 B2
(45) Date of Patent: Feb. 23, 2016

(54) METHOD FOR THE RADIATION HARDENING OF AN ELECTRONIC CIRCUIT BY PARTITIONING

(71) Applicant: Electricite De France, Paris (FR)

(72) Inventors: Bastien Cousin, Villeurbanne (FR); Gilles Deleuze, Paris (FR); Laurent Cretinon, Poleymieux-au-Mont-d'or (FR); Gutemberg Goncalves Dos Santos, Jr., Paris (FR); Lirida Naviner, Le Blanc Mesnil (FR)

(73) Assignee: Electricite De France (FR)

( * ) Notice: Subject to any disclaimer, the term of this patent is extended or adjusted under 35 U.S.C. 154(b) by 0 days.

(21) Appl. No.: 14/648,374

(22) PCT Filed: Nov. 29, 2013

(86) PCT No.: PCT/EP2013/075099
§ 371 (c)(1),
(2) Date: May 29, 2015

(87) PCT Pub. No.: WO2014/083159
PCT Pub. Date: Jun. 5, 2014

(65) Prior Publication Data
US 2015/0295578 A1    Oct. 15, 2015

(30) Foreign Application Priority Data

Nov. 29, 2012  (FR) ...................................... 12 61439

(51) Int. Cl.
*H03K 19/003*    (2006.01)
(52) U.S. Cl.
CPC ...... *H03K 19/0033* (2013.01); *H03K 19/00392* (2013.01)

(58) Field of Classification Search
None
See application file for complete search history.

(56) References Cited

U.S. PATENT DOCUMENTS

2010/0268987 A1* 10/2010 Clark et al. ..................... 714/16

OTHER PUBLICATIONS

Kastensmidt F L et al: "On the Optimal Design of Triple Modular Redundancy Logic for SRAM-based FPGAs", Design, Automation and Test in Europe, 2005, Proceedings Munich, Germany Mar. 7-11, 2005, Piscataway, NJ, USA, IEEE, Mar. 7, 2005, pp. 1290-1295, XP010780217.

(Continued)

*Primary Examiner* — Anh Tran
(74) *Attorney, Agent, or Firm* — Lerner, David, Littenberg, Krumholz & Mentlik, LLP

(57) ABSTRACT

The method relates to a method for the radiation hardening of an electronic circuit by partitioning, said circuit including an odd number K of parallel branches connected to a same primary input I and each including a same series of N modules and N–1 nodes linking two consecutive modules, the K branches together forming a series of N–1 gates respectively consisting of parallel K nodes, and a primary arbiter forming a majority vote from the output signal of the K branches, the method being characterized in that it includes the following steps which are repeated for each one of the gates: determining a reliability of a subcircuit upstream from the gate consisting of the portions of the K branches located between the primary input and the gate, and the insertion of at least one arbiter at the gate forming a majority vote from the output signals of said portions of branches constituting the scanned subcircuit and outputting at least one majority signal to the respective inputs of an additional subcircuit formed by the branch portions downstream from the gate, if the reliability of the scanned subcircuit is less than a reliability set point.

8 Claims, 3 Drawing Sheets

(56) References Cited

OTHER PUBLICATIONS

Manuzzato A et al: "Sensitivity evaluation of TMR-hardened circuits to multiple SEUs Induced by alpha particles in commercial SRAM-based FPGAs", Defect and Fault-Tolerance in VLSI Systems, 2007, DFT '07, 22nd IEEE, International Symposium on, IEEE, Piscataway, NJ, USA, Sep. 26, 2007, pp. 79-86, XP031337800.
International Search Report for Application No. PCT/EP2013/075099 dated Mar. 7, 2014.
International Written Opinion for Application No. PCT/EP2013/075099 dated Mar. 7, 2014.

* cited by examiner

METHOD FOR THE RADIATION HARDENING OF AN ELECTRONIC CIRCUIT BY PARTITIONING

CROSS REFERENCE TO RELATED APPLICATIONS

This application is a national phase entry under 35 U.S.C. §371 of International Application No. PCT/EP2013/075099, filed Nov. 29, 2013, published in French, which claims priority from French Patent Application No. 1261439, filed Nov. 29, 2012, the disclosures of which are incorporated by references herein.

FIELD OF THE INVENTION

The invention relates to the field of hardening techniques of electronic circuits, more particularly to logical hardening techniques using modular redundancy.

PRIOR ART

The majority of electronic components of electronic circuits is sensitive to electromagnetic radiation which can generate Single Event Transient.

Triple modular redundancy (TMR) is a logical hardening technique consisting of introducing redundancy to an electronic circuit at the design stage.

In reference to FIG. 1, a module M ensuring a given function is replaced according to this technique by a TMR bloc comprising three identical modules M in parallel performing the same function, and an arbiter placed at their respective outputs. The arbiter forms a majority vote from the output signals of the three replicated modules and produces a non-ambiguous output signal by means of the odd number of these modules. This output signal is correct even if one of the three modules is faulty, which can constitute sufficient efficacy in many practical cases. The occurrence of several simultaneous faults however will produce incorrect output.

A first category of logical hardening techniques proposes selecting in a complex circuit without redundancy sub-circuits particularly sensitive to faults and replacing each sub-circuit identified by a TMR block ensuring the same function. These are STMR techniques, "Selective TMR", as some parts of the circuit are not replicated.

STMR techniques however are not adapted to circuits requiring a very high level of reliability, such as for example circuits potentially integrated into electrical control-command equipment of nuclear power plants.

Another category of logical hardening techniques via partitioning proposes inserting extra arbiters into a circuit already forming a TMR block on a series of N modules $M_1, \ldots, M_N$ in its entirety. The insertion of arbiters divides the circuit into partitions each comprising one arbiter. The single fault restriction mentioned previously is limited to each partition. So if there are J partitions $C_1, \ldots C_j$ the circuit can be tolerant up to J simultaneous faults, provided there is no more than one fault per partition.

Yet, arbiters with majority vote are particularly heavy components, as they require a high level of internal reliability. Consequently, hardening by partitioning therefore causes a substantial increase in manufacturing costs and an increase in the surface of the circuit.

PRESENTATION OF INVENTION

The invention proposes a hardening technique by partitioning optimising the number of arbiters inserted to ensure a level of reliability determined for the circuit without as such engendering an excessive increase in manufacturing costs or excessively increasing the surface of the circuit.

This aim is attained by a logical hardening method by partitioning of an electronic circuit comprising an odd number K of branches in parallel connected to the same primary input I and each comprising the same series of N modules and N−1 nodes joining two consecutive modules, the K branches together forming a succession of N−1 gates constituted respectively by K nodes in parallel, and a primary arbiter forming a majority vote from the output signals of the K branches, the method being characterized in that it comprises the following steps repeated for each of the gates taken successively from the gate closest to the primary input:

Determination of reliability of a sub-circuit upstream of the gate constituted by the portions of the K branches comprises between the primary input and the gate, and Insertion of at least one arbiter at the gate forming a majority vote from the output signals of said portions of branches constituting the scanned sub-circuit, and delivering at least one majority signal to the respective inputs of a complementary sub-circuit constituted by the portions of branches downstream from the gate, if the reliability of the scanned sub-circuit is less than a reliability set point.

An advantage of the present invention is the reduction in manufacturing costs. Another advantage of the present invention is that it can easily be automated.

Advantageously, the insertion step of at least one arbiter comprises insertion of an arbiter delivering a single majority signal to the respective inputs of the complementary sub-circuit. As a variant, the insertion step of at least one arbiter comprises the insertion of K arbiters in parallel each delivering a majority signal to one of the respective inputs of the complementary sub-circuit.

In addition, the invention relates to a computer program product comprising code instructions for execution of the hardening method described previously, when this program product is executed by data processing means.

DETAILED DESCRIPTION OF INVENTION

An initial circuit prior to logical hardening by partitioning will first be described in detail.

The circuit comprises an odd number K of main branches in parallel connected to the same primary input I, as per the known technique of modular order redundancy K.

The K branches each comprise the same series of N modules $M_{i,\ i \in [[1, N]]}$, $M_1$ being the module closest to the primary input I of the circuit and $M_N$ the module the farthest away from the latter.

The series of N modules produces the overall logical function of the circuit. Each of the modules of this series is a sub-circuit itself ensuring a logical sub-function and comprises an input and an output. A module can therefore be complex or can ensure a logical elementary function, such as for example an inverter.

Each branch also comprises N−1 nodes ensuring the connection between two consecutive modules. By way of convention, gate p, of level i will be called all the parallel K nodes of the circuit making each connection between a module M$_i$ and its successor M$_{i+1}$ in a specific branch. The circuit therefore comprises N−1 gates $p_{i, i \in [[1,N-1]]}$.

A primary arbiter V$_N$ is placed at the output of the K branches, more precisely at the output of the last K modules M$_N$ of each branch. In this way, this arbiter V$_N$ forms a majority vote from the output signals of the K branches and delivers a majority signal to at least one primary output O.

Figure 1:
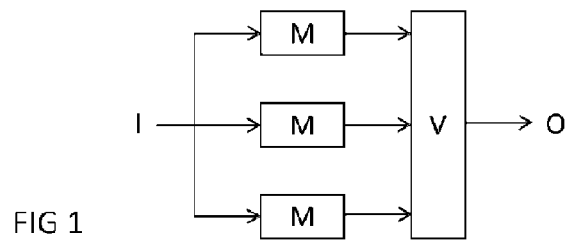
FIG. 1 illustrates a circuit comprising a module protected by triple modular redundancy.
Figure 2:
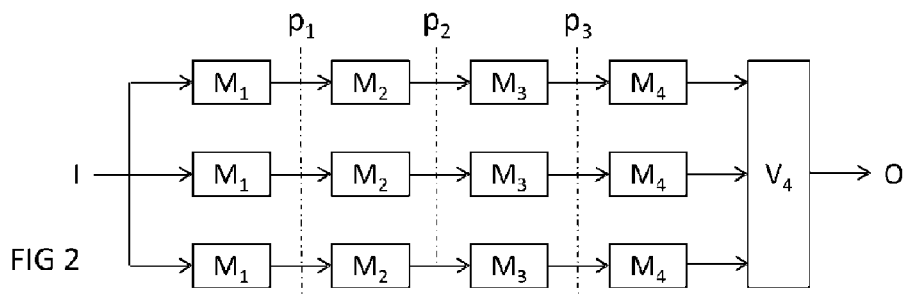
FIG. 2 illustrates a circuit comprising a series of four modules, protected by triple modular redundancy.

FIG. 2 is an example of a circuit according to the previous description where the number of branches K is 3 and the number N of modules is 4: in this circuit, the arbiter V$_4$ is placed at the output of 3 branches each comprising a series of four modules M$_1$, M$_2$, M$_3$ and M$_4$ and three gates p$_1$, p$_2$ and p$_3$ interposed between two consecutive modules; each of these gates comprises three nodes located on a separate branch.

Figure 3:
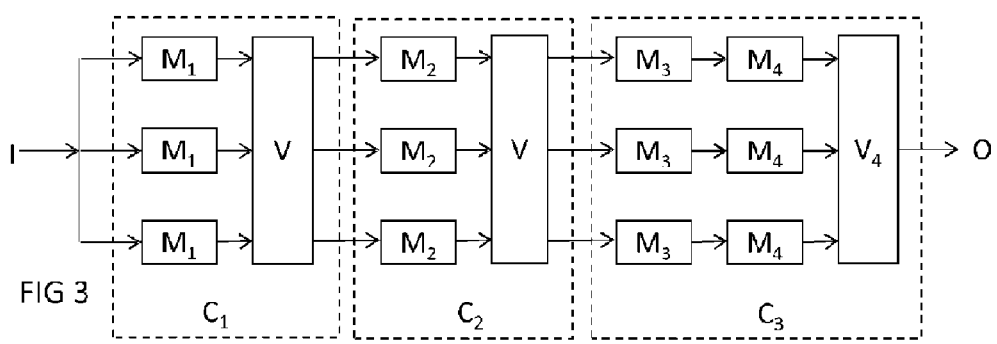
FIG. 3 illustrates an example of a circuit resulting from hardening by partitioning applied to the circuit of FIG. 2.

FIG. 3 illustrates the circuit of FIG. 2 after an example of partitioning according to the invention. Arbiters have been inserted into this circuit at gates p$_1$ and p$_2$, but not at gate p$_3$. In this way, the resulting circuit comprises three partitions C$_1$, C$_2$ and C$_3$.

A measuring unit representative of the reliability of a circuit is the probability of a correct signal at its output. Throughout the present document, the term "reliability" will therefore designate this measuring unit. Several methods for measuring reliability known from of the prior art: for example, the SPR method presented in the document "SPR Tool: Signal Reliability Analysis of Logic Circuits" by Franco et al., or again the PTM method exploiting transfer matrices.

Figure 4A:
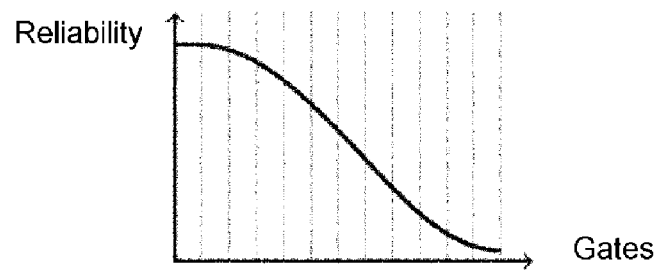
FIGS. 4A, 4B and 4C show the evolution of the reliability of a circuit as a function of the number of gates it contains.

FIG. 4A shows the evolution of the reliability of a signal as a function of the number of gates in a non-partitioned circuit. In general, it is evident that the more gates a circuit has (in other terms, a large number of modules) the lower the reliability of the signal at output of this circuit.

Figure 4B:
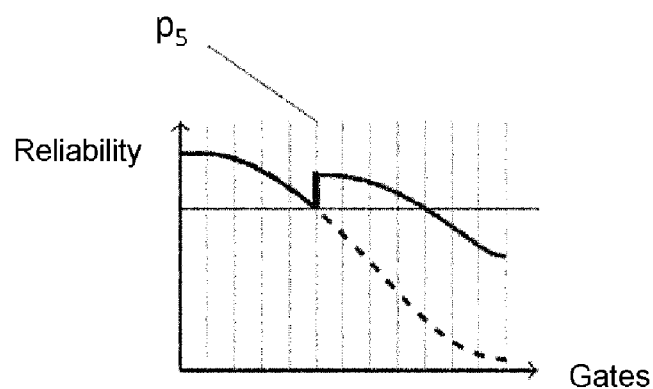

However, when an arbiter of majority vote is inserted at a gate, the reliability of the signal at this gate rises because of the majority vote formed by the inserted arbiter. FIG. 4B schematically illustrates the reliability curve of the same circuit after insertion of an arbiter at the gate p$_5$.

Figure 4C:
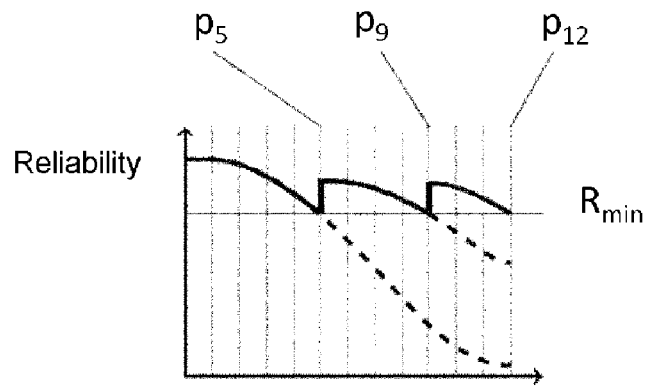

In the same way, FIG. 4C schematically illustrates the curve of reliability of the same circuit after insertion of arbiters at the gates p$_5$, p$_9$ and p$_{12}$.

Because of these arbiters, the reliability of the circuit is kept greater than a value R$_{min}$.

The hardening method according to the invention will now be described. Let R$_{min}$ be a minimal reliability set point to be respected for a non-partitioned circuit. The aim here is to obtain a partitioned circuit whereof the reliability of the signal measured at its primary output O is greater than or equal to this set point R$_{min}$.

In the method according to the invention, the gates of a circuit are scanned successively from upstream to downstream, that is, from the gate p$_1$ closest to the primary input I to the gate p$_{N-1}$ farthest from the latter.

This first takes therefore at the closest gate p$_1$.

Figure 5:
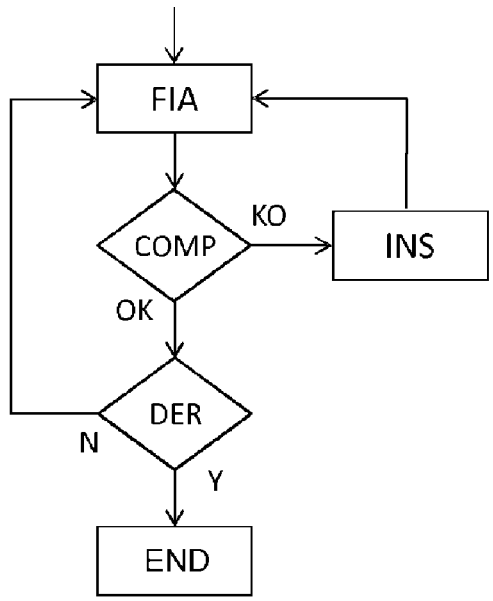
FIG. 5 is a diagram of steps of the hardening method by partitioning according to the invention.

In reference to the diagram of FIG. 5, reliability R$_1$ of the sub circuit between the primary input I and the gate p$_1$ is determined in a first step FIA constituted by K portions of parallel branches, each comprising the same module M$_1$.

The determined reliability R$_1$ is then compared COMP to the reliability set point R$_{min}$:

If R$_1 \geq$ R$_{min}$ then the sub-circuit upstream of the gate pi comprising K modules M$_1$ is considered reliable (OK);

If R$_1 <$ R$_{min}$ then the sub-circuit upstream of the gate pi comprising K modules M$_1$ (KO) is considered as being insufficiently reliable and in this case insertion INS of at least one arbiter V is done at the gate p$_i$. The at least one inserted arbiter V creates a majority vote of the output signals of the K modules M$_1$ and delivers a majority signal of reliability greater than R$_1$ at input of the K modules M$_2$.

The steps illustrated in the diagram of FIG. 5 are repeated for each of the N−1 gates of the circuit described previously.

In general in any gate p$_i$, the sub-circuit upstream of the gate p$_i$ comprises K portions of parallel branches each comprising a series of i modules M$_1$, ..., M$_i$, and the complementary sub-circuit downstream from the gate p$_1$ comprises K portions of parallel branches each comprising a series of N−i modules M$_{i+i}$, ..., M$_N$.

During step FIA the reliability R$_i$ of the sub-circuit upstream of the gate p$_i$ is determined.

The determined reliability R$_1$ is then compared COMP to the reliability set point R$_{min}$:

If R$_i \geq$ R$_{min}$ then the sub-circuit upstream of the gate p$_i$ is considered reliable (OK);

The level i of the gate p$_i$ is then verified in a test DER.

If i<N−1, this takes place at the following downstream gate p$_{i+i}$.

If i=N−1, all the gates have been scanned and the method terminates (FIN);

If R$_i <$ R$_{min}$ then the sub-circuit upstream of the gate p$_i$ is considered insufficiently reliable (KO) and in this case insertion INS of at least one arbiter V is performed at the gate p$_i$. The at least one inserted arbiter V forms a majority vote of the output signals of the K portions of branches of the sub-circuit upstream of the gate p$_i$ (whereof the last module is M$_i$) and delivers a majority signal of reliability greater than R$_{min}$ at input of the K portions of branches of the complementary downstream circuit (whereof the first module is M$_{i+i}$).

Once all the gates are scanned, J arbiters have been inserted into J gates of the circuit, where 0≤J≤N−1, in addition to the primary arbiter V$_N$. The resulting circuit comprises J+1 partitions (C$_1$, ..., C$_{j+1}$) each comprising a sub-circuit constituted by K portions of the branches in parallel and an arbiter V inserted at the output of said portions. In the circuit illustrated in FIG. 3, two arbiters V have been inserted in addition to the primary arbiter V$_4$, with the resulting circuit comprising three partitions C$_1$, C$_2$, C$_3$.

The method consequently introduces a number of minimal partitions to the initial circuit to produce a resulting circuit having reliability of at least R$_{min}$.

It is known from the prior art that theoretical partitioning of a circuit creating a gain in maximum reliability is partitioning whereof the partitions all have equal reliability. But surprisingly, the method according to the invention gives results very close to this optimum despite its simplicity.

The insertion step INS can form the object of several variants.

Figure 6A:
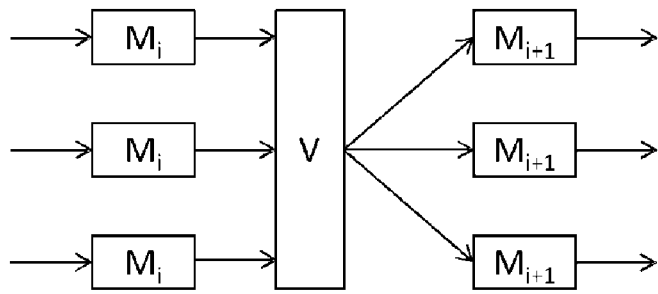
FIGS. 6A and 6B show two embodiments of arbiters inserted during the method according to the invention.

In a first embodiment illustrated by FIG. 6A, the insertion step executed at the gate p, comprises insertion of a single arbiter delivering a single majority signal to the respective inputs of the sub-circuit downstream from the gate p, whereof the first module on each branch is M$_{i+1}$.

The advantage of this embodiment is its economical character: at any given gate a single arbiter component is in fact necessary and a single majority vote is formed during operation of the circuit.

Figure 6B:
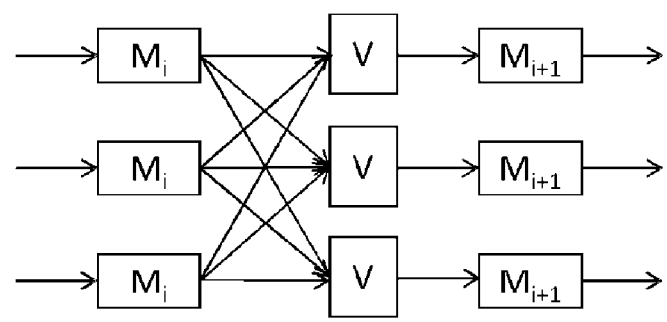

As a variant illustrated in FIG. 6B, the insertion step executed at gate $p_i$ comprises insertion of K arbiters in parallel, each delivering a majority signal to one of the respective inputs of the sub-circuit downstream from the gate p, whereof the first module is $M_{i+1}$.

This variant further improves the reliability of the circuit as it eliminates any malfunction of a minority of K arbiters, such as for example the case K=3 (triple modular redundancy). If one of the 3 arbiters V placed at gate $p_i$ undergoes malfunction it generates an erroneous majority signal which will be sent to only one of the K branches of the sub-circuit downstream from the gate $p_i$. The following arbiter, the primary arbiter $V_N$, if needed could eliminate this error in turn by forming a majority vote.

It is evident that the circuit of particular topology on which the hardening method presented in this document is applied can be a portion of a circuit of free topology, this portion defining a signal path between a primary input I and a primary output O.

In other words, the hardening method can be repeated on each of the i*j sub-circuits defining a signal path in a circuit comprising i primary inputs and j primary outputs.

The invention claimed is:

1. A logic hardening method implemented by a computer by partitioning of an electronic circuit comprising:
    an odd number K of branches in parallel connected to the same primary input (I) and each comprising the same series of N modules ($M_1$, ..., $M_N$) and N−1 nodes joining two consecutive modules, the K branches together forming a succession of N−1 gates ($p_i$, ..., $p_{N-1}$) constituted respectively by K nodes in parallel, and
    a primary arbiter ($V_N$) forming a majority vote from the output signals of the K branches, the method being characterized in that it comprises the following steps repeated for each of the gates ($p_1$, ..., $p_i$, $p_{N-1}$) taken successively from the closest gate ($p_1$) to the primary input (I):
    determination (FIA) of reliability $R_i$ of a sub-circuit upstream of the gate ($p_i$) constituted by the portions of the K branches located between the primary input and the gate ($p_i$),
    insertion (INS) of at least one arbiter ($V_i$) at the gate ($p_i$) performing a majority vote from the output signals of said portions of branches constituting the scanned sub-circuit, and delivering at least one majority signal to the respective inputs of a complementary sub-circuit constituted by the portions of branches downstream from the gate ($p_i$), if the reliability $R_i$ of the scanned sub-circuit is less than a reliability set point $R_{min}$.

2. The hardening method according to claim 1, wherein the insertion step of at least one arbiter comprises the insertion of an arbiter delivering a single majority signal to the respective inputs of the complementary sub-circuit.

3. The hardening method according to claim 1, wherein the insertion step of at least one arbiter comprises insertion of K arbiters in parallel each delivering a majority signal to one of the respective inputs of the complementary sub-circuit.

4. A computer program product comprising code instructions for execution of the method according to claim 1, when this program product is executed by a computer.

5. The hardening method according to claim 2, wherein the insertion step of at least one arbiter comprises insertion of K arbiters in parallel each delivering a majority signal to one of the respective inputs of the complementary sub-circuit.

6. A computer program product comprising code instructions for execution of the method according to claim 2, when this program product is executed by data-processing means.

7. A computer program product comprising code instructions for execution of the method according to claim 3, when this program product is executed by data-processing means.

8. A computer program product comprising code instructions for execution of the method according to claim 5, when this program product is executed by data-processing means.

* * * * *